No. 846,790. PATENTED MAR. 12, 1907.
H. F. W. HUEG.
DOUGH SHAPING MACHINE.
APPLICATION FILED MAR. 6, 1906. RENEWED JAN. 17, 1907.
2 SHEETS—SHEET 1.
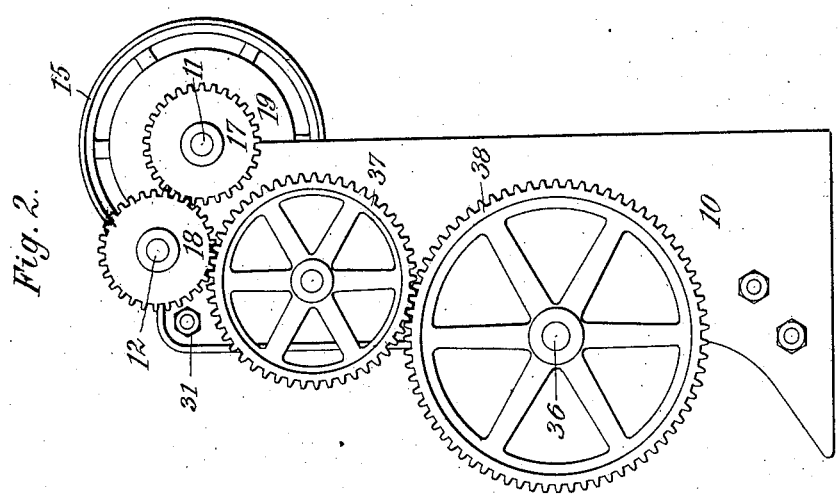
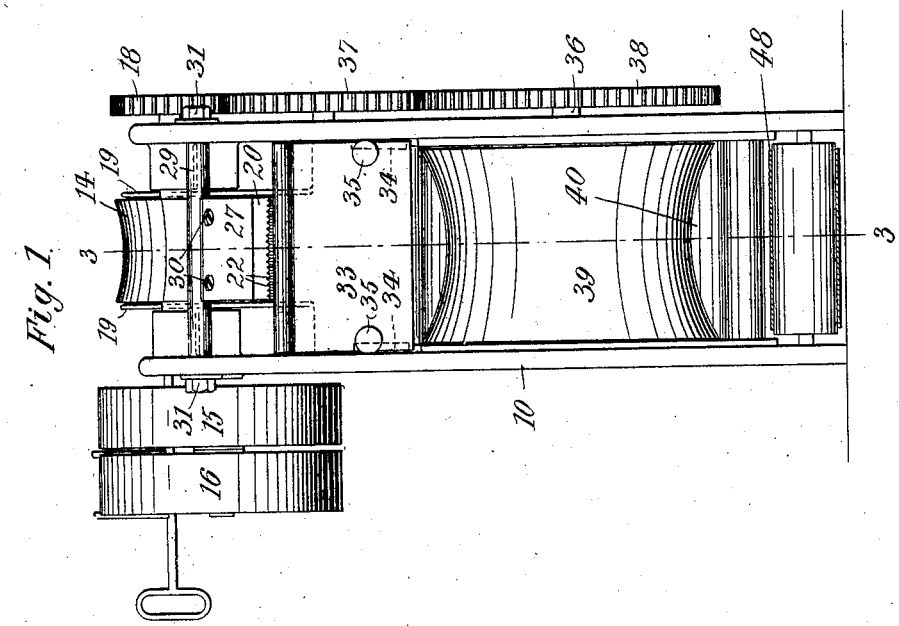
Witnesses:
Inventor:
Herman F. W. Hueg, No. 846,790. PATENTED MAR. 12, 1907.
H. F. W. HUEG.
DOUGH SHAPING MACHINE.
APPLICATION FILED MAR. 6, 1906. RENEWED JAN. 17, 1907.
2 SHEETS—SHEET 2.
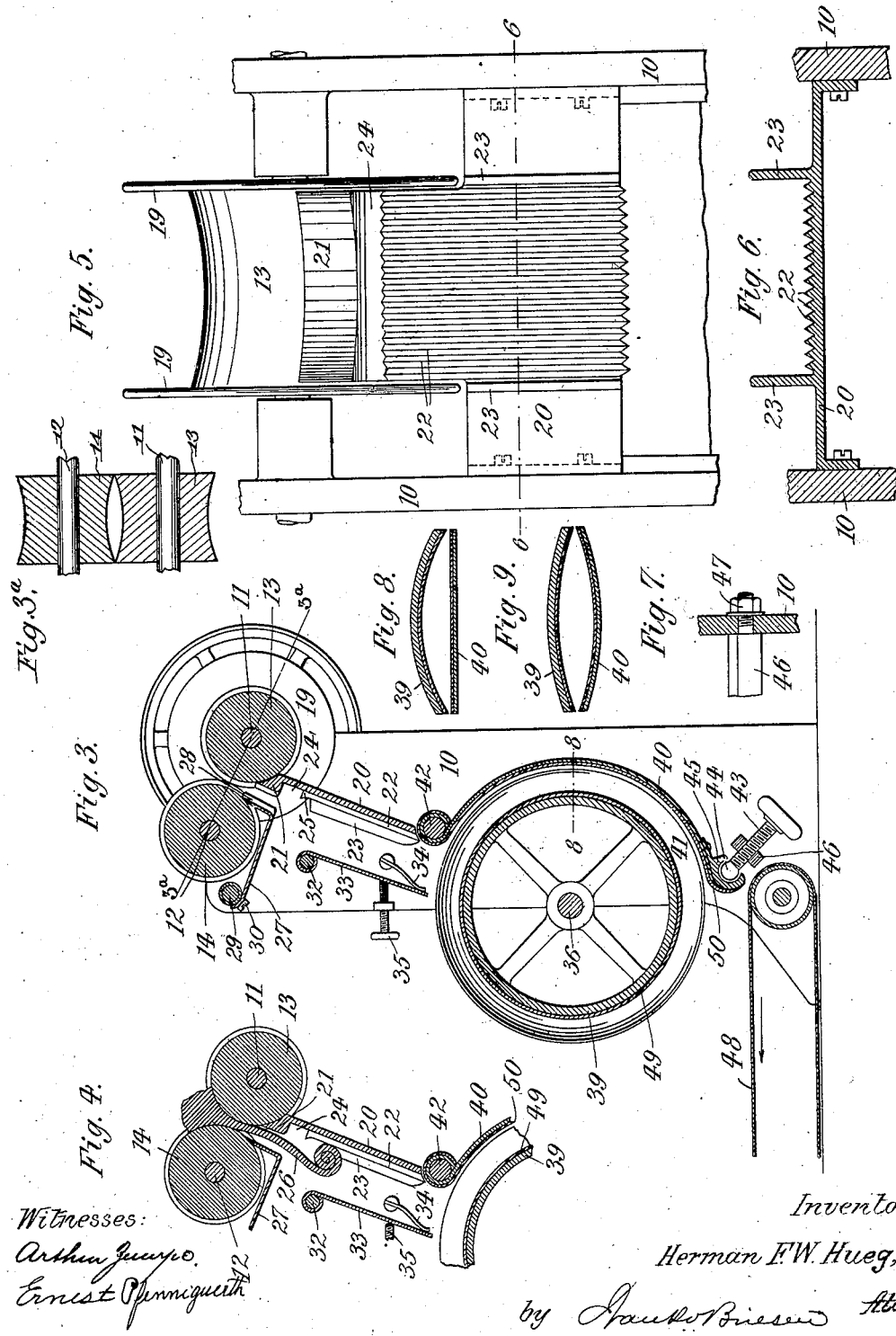
Witnesses:
Inventor:
Herman F.W. Hueg,
by

UNITED STATES PATENT OFFICE.

HERMAN F. W. HUEG, OF NEW YORK, N. Y.

DOUGH-SHAPING MACHINE.

No. 846,790.     Specification of Letters Patent.     Patented March 12, 1907.

Application filed March 6, 1906. Renewed January 17, 1907. Serial No. 352,812.

*To all whom it may concern:*

Be it known that I, HERMAN F. W. HUEG, a citizen of the United States, residing at New York city, (Queens,) county of Queens, State of New York, have invented new and useful Improvements in Dough-Shaping Machines, of which the following is a specification.

This invention relates to an improved machine for molding dough which has been previously subdivided into batches of suitable size by a dough-dividing machine.

The machine is more particularly adapted for molding "Vienna loaves," being loaves that are pointed at both ends; but it may also be used for differently-shaped loaves or rolls.

The machine performs its work reliably and quickly, is of simple construction, and cleans itself automatically during operation.

In the accompanying drawings, Figure 1 is a front elevation of my improved dough-shaping machine; Fig. 2, a side elevation thereof; Fig. 3, a vertical section on line 3 3, Fig. 1; Fig. 3$^a$, a section through the feed-rollers on line 3$^a$ 3$^a$, Fig. 3; Fig. 4, a similar section through the upper part of the machine, showing a partly-rolled sheet of dough. Fig. 5 is a detail of the coiling-plate and adjoining roller; Fig. 6, a cross-section on line 6 6, Fig. 5; Fig. 7, a detail of part of the apron-setting device; Fig. 8, a cross-section on line 8 8, Fig. 3; and Fig. 9, a similar section through a modification of the drum and apron.

In the frame 10 of the machine are journaled the shafts 11 12 of a pair of drawing or feed rollers 13 14, fast on such shafts. These rollers are provided with concave working rims, which are opposed to each other to form an intervening convex groove pointed along both edges. The rollers mold the dough into a correspondingly bulged and pointed sheet, which is delivered to the concave drum hereinafter described. Shaft 11 carries fast and loose pulleys 15 16 and imparts motion to shaft 12 by gear-wheels 17 18. Roller 13 is provided with flanges 19, that flank roller 14. Below roller 13 is arranged an inclined coiling-plate 20, which is adapted to roll into a spiral the sheet of dough delivered to it by rollers 13 14. Plate 20 has an upper projection 21, which constitutes a scraper for roller 13 and serves at the same time to hold the dough off such roller. The surface of projection 21 may be concave to correspond to the curvature of roller 13, Fig. 5. At a distance below projection 21 plate 20 is provided with a series of longitudinal ribs 22, which are of triangular shape in cross-section, Fig. 6. These ribs are flanked by flanges 23 and serve in conjunction with such flanges to prevent a lateral swerving of the dough.

Between projection 21 and the upper ends of ribs 22 there is formed on plate 20 a recess or pocket 24, while such upper ends of ribs 22 are turned outward, as at 25, to form stops below such pocket. Thus when the bottom of the dough sheet 26 has cleared projection 21 it will during its descent gravitate against stops 25, which detain it for a period sufficient to start the rolling-up operation of the dough sheet into a spiral, Fig. 4. The roller 14 is engaged by an angular scraper 27, the bent-forward end 28 of which may be concaved in conformity with the contour of roller 14 and constitutes a guard for holding the dough sheet off said roller. The scraper 27 is secured to a tie-rod 29 of frame 10 by screws 30. By slackening nuts 31, fitted on the ends of rod 29, and turning the latter the scraper may be readily adjusted.

Below roller 14 and opposite coiling-plate 20 there is hung upon a rod 32 a guard-plate 33, which is engaged on one side by springs 34 and on the other side by set-screws 35. The latter serve to set plate 33 at different inclinations, as will be readily understood.

In the lower part of frame 10 turns a shaft 36, which is driven from gear-wheel 18 by wheels 37 38. Upon shaft 36 is mounted a drum 39, which has a concave working surface. Drum 39 is partly surrounded by a correspondingly-curved compressing plate or apron 40, between which and the drum there is formed a curved channel 41. Apron 40 is hinged at its upper end to a rod 42, beneath the bottom of the coiling-plate 20. The lower end of apron 40 is provided with means for adjusting the distance between apron and drum. These means consist of a set-screw 43, having a ball-shaped end 44, which engages a socket 45 on the lower end of apron 40, thus constituting a swivel. Set-screw 43 is tapped into a transverse bar 46, rotatably hung in frame 10 and adapted to be locked thereto by nuts 47. These nuts, in conjunction with screw 43, permit the apron to be swung toward or away from drum 39 to any extent desired.

The dough spiral formed on coiling-plate 20 drops into channel 41 and while passing along said channel is molded to assume its proper final shape. Channel 41 delivers the molded dough to an endless carrier 48, that conveys it to the oven or other place desired.

The working surfaces of drum 39 and apron 40 are preferably covered with canvas 49 50. The apron 40 may be either of straight form in cross-section, as shown in Fig. 8, or of concave form, as shown in Fig. 9, according to the shape to be imparted to the loaf.

What I claim is—

1. In a dough-shaping machine, a pair of opposed feed-rollers having concave rims to form an intervening convex and pointed groove, combined with a concave drum, a coöperating apron, and means for conveying the dough from the feed-rollers to the drum, substantially as specified.

2. In a dough-shaping machine, a pair of feed-rollers, and a drum, combined with an intervening coiling-plate having a series of longitudinal ribs, substantially as specified.

3. In a dough-shaping machine, a pair of feed-rollers, and a drum, combined with an intervening coiling-plate having an upper projection that engages one of the feed-rollers, substantially as specified.

4. In a dough-shaping machine, a pair of feed-rollers, and a drum, combined with an intervening coiling-plate having an upper projection that engages one of said rollers, a stop, and a pocket between projection and stop, substantially as specified.

5. In a dough-shaping machine, a pair of feed-rollers, and a drum, combined with an intervening coiling-plate having an upper projection, a series of longitudinal ribs, and a pocket between the projection and ribs, substantially as specified.

6. In a dough-shaping machine, a pair of feed-rollers, and a drum, combined with an intervening flanged coiling-plate having a series of longitudinal ribs, substantially as specified.

7. In a dough-shaping machine, a drum, combined with a pivoted apron, a swiveled set-screw engaging the apron, a rotatable bar engaging the set-screw, and a locking-nut engaging the bar, substantially as specified.

8. In a dough-shaping machine, a pair of concaved feed-rolls, a shaping-drum and means for conveying the dough from the feed-rolls to the drum.

9. In a dough-shaping machine, concaved feed-rolls, a concaved drum, a concaved apron coöperating therewith, and means for conveying the dough from the feed-rollers to the drum and apron.

10. In a dough-shaping machine, concaved feed-rolls combined with a shaping drum and apron, and means for conveying the dough from the feed-rolls to the drum and apron.

Signed by me at New York city, (Manhattan,) New York, this 5th day of March, 1906.

HERMAN F. W. HUEG.

Witnesses:
WILLIAM SCHULZ,
FRANK V. BRIESEN.